United States Patent [19]

Leist

[11] 4,369,050
[45] Jan. 18, 1983

[54] SELF CLEANING PAPER TRAP

[75] Inventor: William L. Leist, Middleton Village, N.J.

[73] Assignee: The G. A. Kleissler Company, Edison, N.J.

[21] Appl. No.: 245,332

[22] Filed: Mar. 19, 1981

[51] Int. Cl.³ .................. B01D 46/48; B01D 49/00
[52] U.S. Cl. ................................. 55/283; 55/289; 55/297
[58] Field of Search .............. 55/270, 272, 283, 289, 55/295, 296, 491, 297, 298; 209/250, 352, 385, 387; 15/246

[56] References Cited

U.S. PATENT DOCUMENTS

| | | | |
|---|---|---|---|
| 1,316,091 | 9/1919 | Freyn | 55/289 |
| 2,925,144 | 2/1960 | Kroll | 55/296 |
| 4,246,011 | 1/1981 | Oberdorfer | 55/283 |

FOREIGN PATENT DOCUMENTS

| | | | |
|---|---|---|---|
| 190550 | 12/1922 | United Kingdom | 55/289 |
| 781791 | 8/1957 | United Kingdom | 55/296 |

Primary Examiner—David L. Lacey
Attorney, Agent, or Firm—William E. Hedges

[57] ABSTRACT

A self-cleaning paper trap for use within a dust control system and mounted in the duct to trap sheet materials. The paper trap includes a housing which carries a plurality of spaced grid bars to trap the sheet materials and a wiper bar which is vertically reciprocal relative to the grid bars to wipe trapped sheet materials from the bars. An automatic cable control apparatus is operatively engaged with the wiper bar to permit remote wiper bar actuation without the need for system shut-down.

14 Claims, 3 Drawing Figures

SELF CLEANING PAPER TRAP

BACKGROUND OF THE INVENTION

The present invention relates generally to the field of paper traps and more particularly is directed to a sheet material trap installed as part of a dust control system.

In the manufacture of fibrous, light-weight products, such as tissue paper, it is often necessary to control dust at the station of manufacture, both to assure proper quality control and also to provide adequate environmental safety conditions for the workers. Dust control systems including fans, ductwork, dust separators and necessary controls have been employed for this purpose. Experience has proven that large pieces of paper tissue and trimmed scrap in addition to the dust particles will frequently be exhausted into the dust control system at the manufacturing station. Adequate provisions must be built into the dust control ductwork to trap such large pieces of tissue paper or other sheet materials before the paper can reach the dust separator. Failure to remove the larger sheet materials can cause the dust separator to clog and thereby substantially eliminate all of the beneficial effects which would be expected from a properly functioning dust control system.

Prior workers in the art have addressed the problem of paper in a dust control duct by providing a paper trap which essentially comprised a plurality of inclined grid bars interiorly positioned within the exhaust duct to catch large pieces of tissue paper or other sheet materials to prevent them from being exhausted further downstream in the system. As the grid bars trapped more and more pieces of the sheet materials, the bars became clogged and the effective free interior duct area was thereby reduced. As more and more pieces of tissue paper became entrapped upon the grid bars, the efficiency of the dust control system was substantially reduced, thereby requiring periodic down time to permit an operator to open an access door located at the paper trap to manually remove all trapped paper tissue or other sheet-like materials from the grid bar. While the manual system of grid bar cleaning was effective to keep the system functioning, such a manual method of operation has proved to be quite expensive both due to the cost of the labor involved and more importantly, due to the down time of the equipment itself.

In certain applications, greater volumes of sheet materials, such as paper tissue are picked up at the work station and exhausted into the dust control system than were originally intended. Under such conditions, much more frequent manual cleaning of the paper trap was subsequently required. This has resulted in more frequent interruptions to the normal manufacturing operation and an annoyance to the machine operators who have found it to be a nuisance to have to continually return to the paper trap for manual removal of the trapped paper.

SUMMARY OF THE INVENTION

The present invention relates generally to the field of paper traps and more particularly, is directed to a self-cleaning type of apparatus designed to automatically wipe trapped paper or other sheet materials from a grid bar assembly.

The present invention relates to a paper trap of the type including a sheet metal housing equipped with suitable inlet and outlet mounting flanges for securing the paper trap in the ductwork of an associated dust control or other fan operated duct system. The mounting flanges may be either circular or rectangular, in known manner, for connection to circular or rectangular portions of the dust control system ductwork. The housing carries a plurality of vertically oriented, transversely spaced grid bars which are supported in the air stream of the dust control system ductwork to trap large pieces of tissue or other paper-like or sheet-like materials which may be picked up by the system. A sturdy wiper bar of wood or plastic material construction is vertically reciprocal upon the grid bars to periodically wipe the bars clean by removing large pieces of tissue from association with the bars, without need for shut down of the dust control system fans.

The wiper bar is powered by a pair of similar, transversely positioned actuators which effect automatic reciprocation of the wiper bar. In a preferred embodiment, each actuator comprises a cylinder of the double acting type including a piston and necessary air inlet and outlet connections. A cable which is trained about upper and lower pulleys is movable by the piston to reciprocate the wiper bar. A 4-way automatic air valve is provided to automatically function and control the operation of the air cylinders to effect automatic, intermittent reciprocation of the wiper bar.

The self-cleaning paper trap of the present invention functions to automatically remove large pieces of tissue or other sheet materials from the grid bars at necessary intervals without requiring shut down of the system. The waste material removed or scraped from the grid bars falls into a chute immediately below the paper trap housing for removal from the system at a convenient time, for example, when the associated dust control system is down.

It is therefore an object of the present invention to provide an improved self-cleaning paper trap of the type set forth.

It is another object of the present invention to provide a novel self-cleaning paper trap including a plurality of vertical grid bars, a wiper bar reciprocal relative to the grid bars to remove paper entrapped thereon and automatic means to move the wiper bar relative to the grid bars.

It is another object of the present invention to provide a novel self-cleaning paper trap comprising a plurality of parallel grid bars which are retained within a suitable housing, a polyethylene plastic or oil impregnated wood wiper bar positioned to periodically wipe the grid bars clean, the wiper bar being reciprocated by a pair of cable control actuators, and an automatically controlled pneumatic power supply system to automatically function the wiper bar relative to the grid bars.

It is another object of the present invention to provide a novel self-cleaning paper trap that is simple in design, automatic in operation and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

FIG. 3 is an enlarged, cross-sectional view taken along line 3—3 on FIG. 2, looking in the direction of the arrows.

DESCRIPTION OF THE PREFERRED EMBODIMENT OF THE INVENTION

Figure 1:
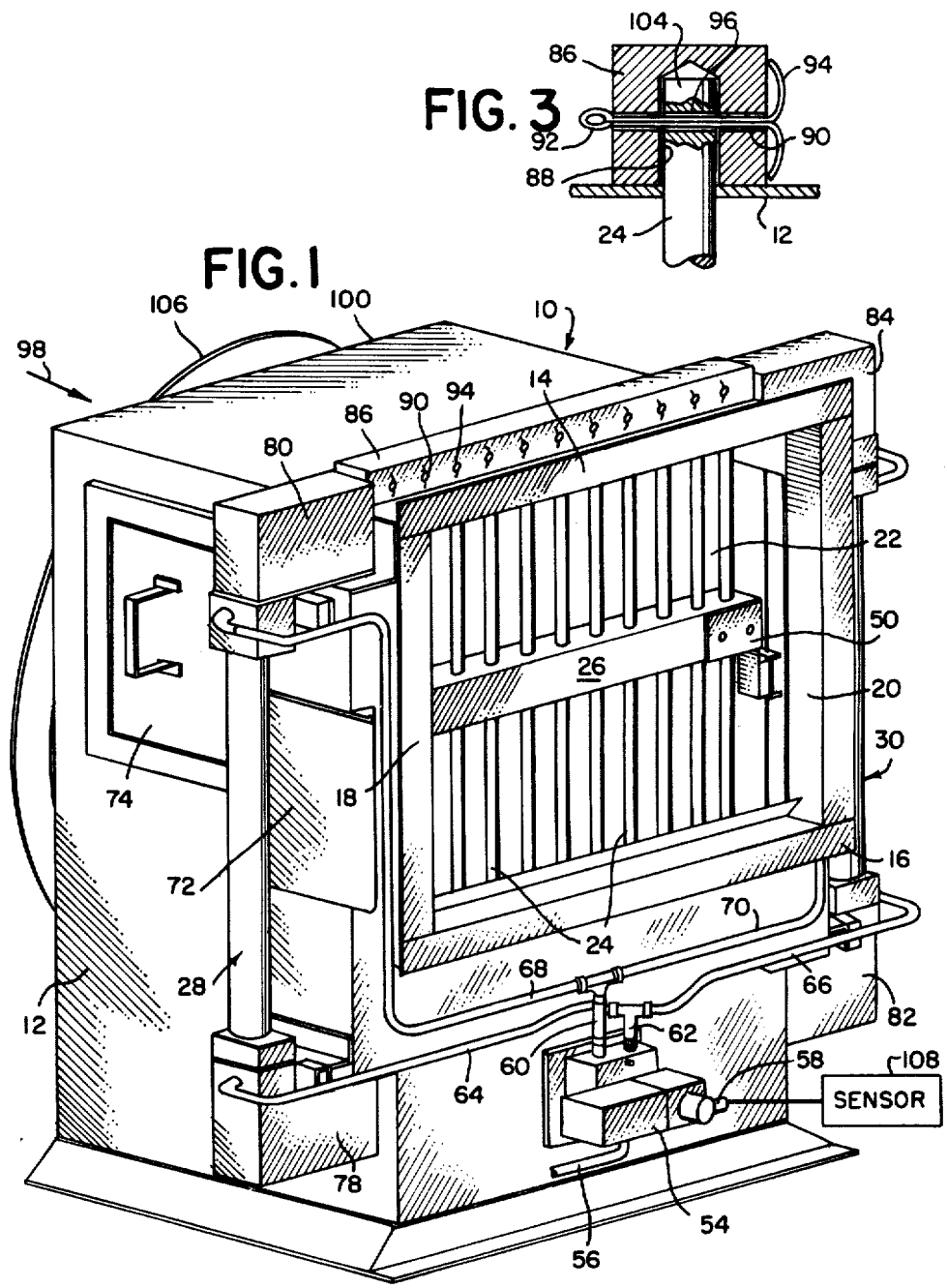
FIG. 1 is a rear perspective view of a self-cleaning paper trap constructed in accordance with the present invention.

Although specific terms are used in the following description for the sake of clarity, these terms are intended to refer only to the particular structure of the invention selected for illustration in the drawings and are not intended to define or limit the scope of the invention.

Figure 2:
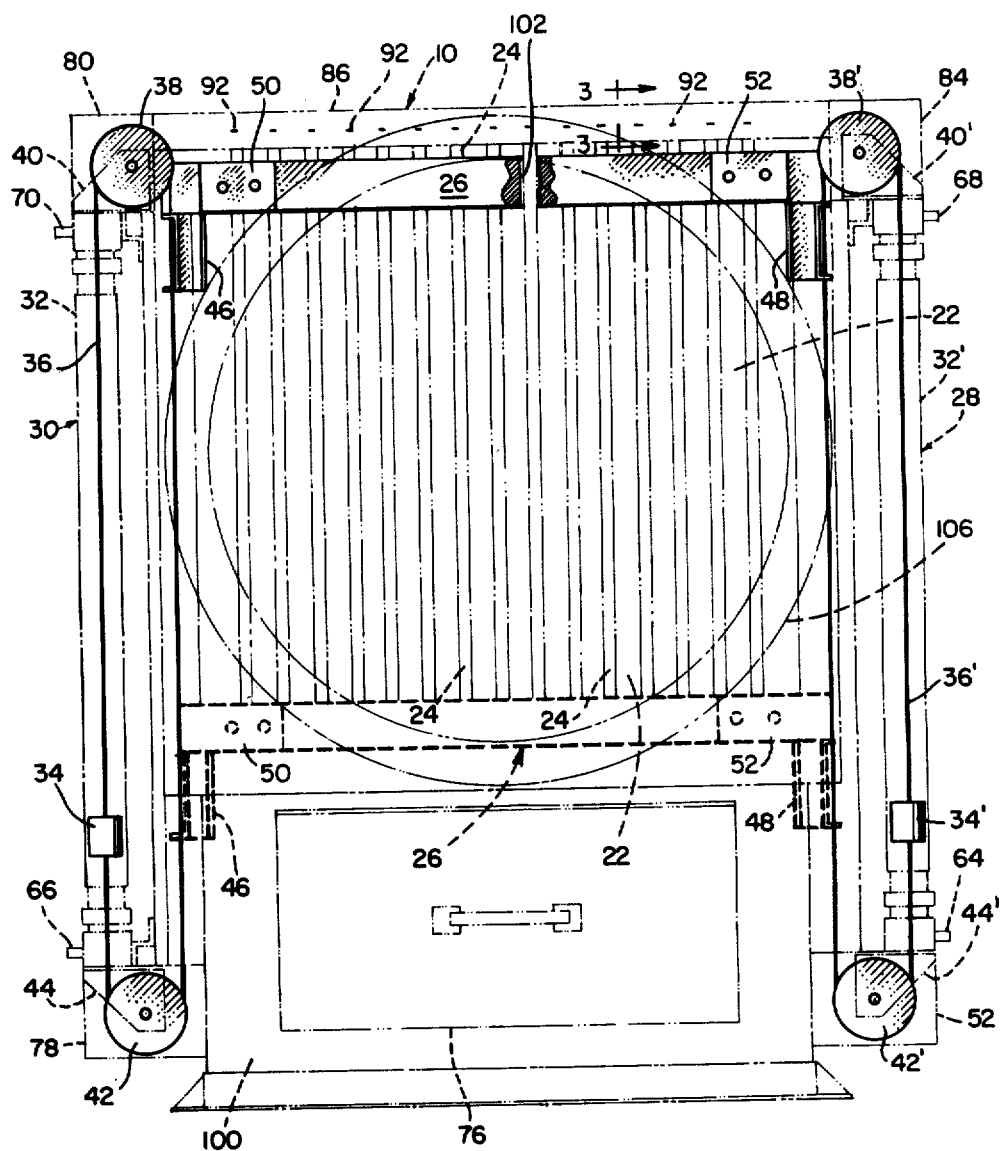
FIG. 2 is a schematic front elevational view of the paper trap of FIG. 1 showing the functioning parts in full lines and supporting structure portions in phantom lines for purposes of clarity.

Referring now to the drawings, there is shown in FIGS. 1 and 2 a self-cleaning paper trap 10 which comprises generally a housing 12 suitable for connection to an existing ductwork (not shown) in well known manner for example, by employing a plurality of horizontal mounting or connecting flanges 14, 16 and inter-connecting vertical mounting flanges 18, 20. With air flowing toward the housing 12 through the ductwork in the direction indicated by the arrow 98, the housing front 100 could be provided with similar horizontal and vertical frame members to connect to a rectangular duct, or optionally, the housing front 100 could be equipped with a circular mounting flange 106 for interconnection with a circular duct (not shown), all in manner well known to those skilled in the art. As best seen in FIG. 2, the framing members 14, 16, 18, 20 and the circular mounting flange 106 define an opening 22 through the housing 12, which opening is axially aligned with the system ductwork to facilitate movement of air through the paper trap 10 without causing an unacceptable increase in the system static pressure.

Still referring to FIGS. 1 and 2, a plurality of vertical, parallel, spaced, grid bars 24 are stationarily retained within the opening 22 to trap and retain large sheets of paper or other light-weight sheet materials which are dimensionally larger than the spaces between the bars and which may be picked up and transported in the direction of the arrow 98 by the associated dust collecting system (not illustrated). A transverse wiper bar 26 is provided with a plurality of spaced openings 102 in axial alignment with the grid bars 24 and is reciprocal relative to the bars 24 from an upper position near the top of the opening 22 as illustrated in full lines in FIG. 2 to a lower position near the bottom of the opening 22 as illustrated in phantom lines in FIG. 2. The downward movement of the wiper bar 26 from its upper, full line position to its lower, phantom line position scrapes or wipes entrapped tissue or other sheet material (not illustrated) downwardly from the plurality of grid bars 24 and out of the air stream. The wiper bar 26 may be fabricated of suitable strong, light-weight, durable material possessing satisfactory properties for vertical concentric sliding engagement with the plurality of grid bars 24, for example, solid polyethylene plastic or oil impregnated wood.

A matched pair of Cable-Trol ® actuators 28, 30 are vertically connected to the housing 12 outwardly of the defined air stream opening 22 to provide an actuating means for lowering and raising the wiper bar 26 for tissue clearing purposes as is well-known in to those skilled in the art "Cable-Trol" is a trademark for a rodless pneumatically operated cylinder designed to provide reciprocating movement of a machine component (in the self cleaning paper trap, the component is the wiper bar). It consists of the cylinder and a piston. On both faces of the piston is attached a cable which, in turn, passes through a U-cap urethane seal at each end of the cylinder, rides over a sheave, and is attached to the machine component which is to be moved. As the piston is forced in one direction by compression, the machine component is forced in the opposite direction. As best seen in FIGS. 1 and 3, the plurality of grid bars 24 are accurately secured in position in spaced vertical planes in a manner to prevent any relative movement between the bars, a condition which could greatly interfere with the easy vertical reciprocation of the wiper bar 26 relative to the grid bars 24. An upper transverse block 86 is welded or otherwise secured to the top of the housing 12 in vertical registration above the tops of the bars 24. As illustrated in FIGS. 2 and 3, a plurality of transversely spaced, downwardly open, vertical sockets or openings 88 are provided to respectively receive therein the top end 104 of each of the grid bars 24 in a secure engagement. The block 86 is laterally drilled to provide a plurality of longitudinally aligned, transversely spaced, horizontal openings 90, which openings respectively intersect the grid bar receiving sockets 88. The top 104 of each bar 24 is similarly drilled or otherwise treated to provide opening 96 in alignment with the upper block openings 90. An elongated cotter pin 92 or similar securing device can then be inserted through the longitudinally aligned openings 90, 96 respectively through the block 86 and the tops of each of the grid bars 24 and then bent as necessary to provide bent ends 94 to thereby secure the parts in the desired alignment.

Each of the actuators 28, 30 comprises a cylinder 32, 32' with a piston 34, 34' vertically reciprocal within the cylinder in known manner. A cable 36, 36' is connected for movement by a respective piston 34, 34' and each cable is trained about an upper pulley 38, 38' and a lower pulley 42, 42' in known manner. The upper pulleys 38, 38' are rotatively supported to the housing by being connected to upper pulley brackets 40, 40' and the lower pulleys 42, 42' are similarly rotatively supported to the housing by being connected to lower pulley brackets 44, 44'. If desired, a cable tension adjusting access door 72 can be conventionally provided in the housing to permit cable adjustment at the piston after installation. As best seen in FIG. 2, left and right wiper bar carriers 46, 48 are securely affixed respectively to the cables 36, 36' and are reciprocated thereby. Suitable connecting brackets 50, 52 secure the left and right transverse edges of the wiper bar 26 to the wiper bar carriers 46, 48 whereby activation of the cable-trol actuators 28, 30 will cause balanced vertical reciprocation of the wiper bar 26 relative to the grid bars 24.

As best seen in FIG. 1, an air inlet pipe 56 introduces operating air from a suitable pneumatic source (not shown), such as a compressed air tank, at operating pressure, for example, approximately 60 p.s.i. to the four way solenoid operated air valve 54. A Versa single solenoid four way valve has been found suitable for this purpose. An electrical current inlet conduit 58 introduces suitable 120 volt current for operation of the valve in known manner. A first outlet pipe 60 from the valve 54 pressurizes the upper air branch conduits 68, 70 to introduce pressurized air into the cylinders 32, 32' above the pistons 34, 34'. Similarly, a second outlet pipe 62 from the valve 54 pressurizes the lower air branch conduit 64, 66 to supply pressurized air into the interior of the cylinders 32, 32' below the bottoms of the pistons 34, 34'. Accordingly, by controlling the introduction of pressurized air into and out of the cylinders 32, 32' above and below the pistons 34, 34', reciprocation of the wiper bar 26 can be effected in a smooth, balanced, automatic manner. If desired, the four way valve 54 can be wired to be responsive to manual, push button control (not shown) in well known manner. Additionally, the valve 54 could be wired for automatic operation, also in known manner, by supplying a suitable automatic switch (also not shown), which switch could be responsive to sensing low static pressure in the housing, or to a change in ambient lighting, to an increase in pressure or perhaps the switch simply could be time controlled. A sensor 108 is schematically shown in FIG. 1 to indicate such an automatic switch.

In the interest of safety and cleanliness, preferably a plurality of pulley covers 78, 80, 82, 84 of sheet metal construction can be provided over the plurality of upper and lower pulleys 38, 38', 42, 42' in well known manner. As illustrated in FIG. 1, a grid bar access door 74 can be provided in the housing 12 to allow access to adjust the cables on the cable-trol actuators. Additionally, a lower clean out 76 is provided in the housing 12 to facilitate manual cleaning of the grid bars 24 or cleaning of the chute below the grid bars.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification but rather only by the scope of the claims appended hereto.

What is claimed is:

1. In a sheet material trap suitable for installation in an opening in the duct of an air handling system, the combination of
    a housing including front and rear mountings, said front and rear mountings being connectable to the duct at each side of the opening,
        the front and rear mountings defining a duct aligned air passage through the housing;
    grid bar means having means affixed in the housing to obstruct part but not all of the said air passage,
        said grid bar means comprising bars adapted to engage sheet materials travelling through the duct to prevent passage through the housing;
    a wiper bar means reciprocal relative to said grid bar means to move the engaged sheet materials out of the air passage; and
    actuator means to automatically reciprocate said wiper bar means, the actuator means comprising a spaced pair of actuators, each of said actuators including a cable secured to a portion of the wiper bar means to simultaneously move the wiper bar means in response to the occurrence of a predetermined condition.

2. The trap of claim 1 wherein the grid bar means comprise a plurality of parallel, spaced grid bars.

3. The trap of claim 2 wherein the grid bars are vertically oriented.

4. The trap of claim 2 wherein the grid bar means further comprises an upper grid block secured to the housing exteriorly of the air passage, the upper grid block being provided with a plurality of downwardly open, spaced, grid bar receiving openings, the top ends of at least some of the grid bars being positioned in the grid bar receiving openings.

5. The trap of claim 4 wherein the grid bar receiving openings are vertically oriented.

6. The trap of claim 5 further including a plurality of horizontal, spaced openings provided in the upper grid block, the horizontal, spaced openings respectively intersecting the vertical grid bar receiving openings.

7. The trap of claim 6 wherein the upper portions of at least some of the grid bars is provided with a horizontal opening, the horizontal grid bar openings being in alignment with each of the horizontal openings in the upper grid block.

8. The trap of claim 7 further including a locking device positioned through the aligned grid bar and upper grid blocks openings to secure the grid bars to the said block.

9. The trap of claim 1 further including a sensor to determine the occurrence of the said predetermined condition.

10. The trap of claim 9 wherein the sensor is electrically interconnected with the actuator means and is constructed and arranged to operate simultaneously the pair of actuators.

11. The trap of claim 9 or claim 10 wherein the sensor is automatic.

12. The trap of claim 1 wherein the actuators each comprise a fluid operated piston and the actuator means comprises a fluid valve, the fluid valve controlling the flow of fluid to the actuator pistons.

13. The trap of claim 12 wherein the fluid is air and wherein the valve is a four way valve.

14. The trap of claim 13 wherein each actuator comprises a cylinder and said piston and wherein the four way valve is connected to and feeds branch ducts which are connected to and introduce air into each cylinder both above and below the piston.

* * * * *